United States Patent
Hsieh

(10) Patent No.: US 11,054,496 B2
(45) Date of Patent: Jul. 6, 2021

(54) METHOD FOR CONNECTING TO NETWORK, NON-TRANSITORY STORAGE MEDIUM, AND ELECTRONIC DEVICE

(71) Applicant: Chiun Mai Communication Systems, Inc., New Taipei (TW)

(72) Inventor: Hsing-Chun Hsieh, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/882,568

(22) Filed: May 25, 2020

(65) Prior Publication Data

US 2020/0371188 A1    Nov. 26, 2020

(30) Foreign Application Priority Data

May 24, 2019  (CN) .......................... 201910441722.3

(51) Int. Cl.
| | |
|---|---|
| *H04W 4/40* | (2018.01) |
| *G01S 3/02* | (2006.01) |
| *G01V 7/00* | (2006.01) |
| *H04W 4/021* | (2018.01) |

(52) U.S. Cl.
CPC ............. *G01S 3/023* (2013.01); *G01V 7/00* (2013.01); *H04W 4/021* (2013.01); *H04W 4/40* (2018.02)

(58) Field of Classification Search
CPC combination set(s) only.
See application file for complete search history.

(56) References Cited

U.S. PATENT DOCUMENTS

| | | | | |
|---|---|---|---|---|
| 10,206,069 | B2* | 2/2019 | Lee | G06F 3/147 |
| 10,416,698 | B2* | 9/2019 | Imes | G05D 23/1917 |
| 2012/0071087 | A1* | 3/2012 | Griffin | H04W 4/21 |
| | | | | 455/41.1 |
| 2012/0190379 | A1* | 7/2012 | Hassan | G01S 19/34 |
| | | | | 455/456.1 |
| 2013/0019284 | A1* | 1/2013 | Pacyga | H04L 67/02 |
| | | | | 726/4 |
| 2014/0045556 | A1* | 2/2014 | Subramanian | B61L 25/025 |
| | | | | 455/574 |
| 2017/0195840 | A1* | 7/2017 | Gao | H04W 4/023 |
| 2020/0371188 | A1* | 11/2020 | Hsieh | H04W 4/80 |
| 2021/0059013 | A1* | 2/2021 | Boccon-Gibod | H04W 84/20 |

* cited by examiner

*Primary Examiner* — Julio R Perez
(74) *Attorney, Agent, or Firm* — ScienBiziP, P.C.

(57) ABSTRACT

A network connection method includes determining whether an electronic device is moving and obtaining position information of the electronic device from the positioning unit in response to determining that the electronic device is moving. The method also determines whether the electronic device is located within a preset range based on the position information, and accordingly generates a movement path in response to determining that a distance between the electronic device and the wireless device is within a preset value. The method further determines whether the movement path of the electronic device matches with a part of at least one stored path; and switches a state of at least one wireless communication unit in response to determining that the movement path of the electronic device matches with a part of the at least one stored path. A related electronic device and a non-transitory storage medium are also provided.

18 Claims, 2 Drawing Sheets

METHOD FOR CONNECTING TO NETWORK, NON-TRANSITORY STORAGE MEDIUM, AND ELECTRONIC DEVICE

FIELD

The subject matter herein generally relates to network communications, and particularly, to a network connection method, a non-transitory storage medium, and an electronic device.

BACKGROUND

An electronic device, for example, a smartphone, when needing to communicate with a network, for example, a BLUETOOTH or WI-FI network, needs to match with a special electronic device. The coupling usually requires a user to operate the electronic device to turn on the BLUETOOTH or WI-FI function, which complicates the operation process.

BRIEF DESCRIPTION OF THE DRAWINGS

Implementations of the present technology will now be described, by way of embodiment, with reference to the attached figures.

DETAILED DESCRIPTION

Figure 1:
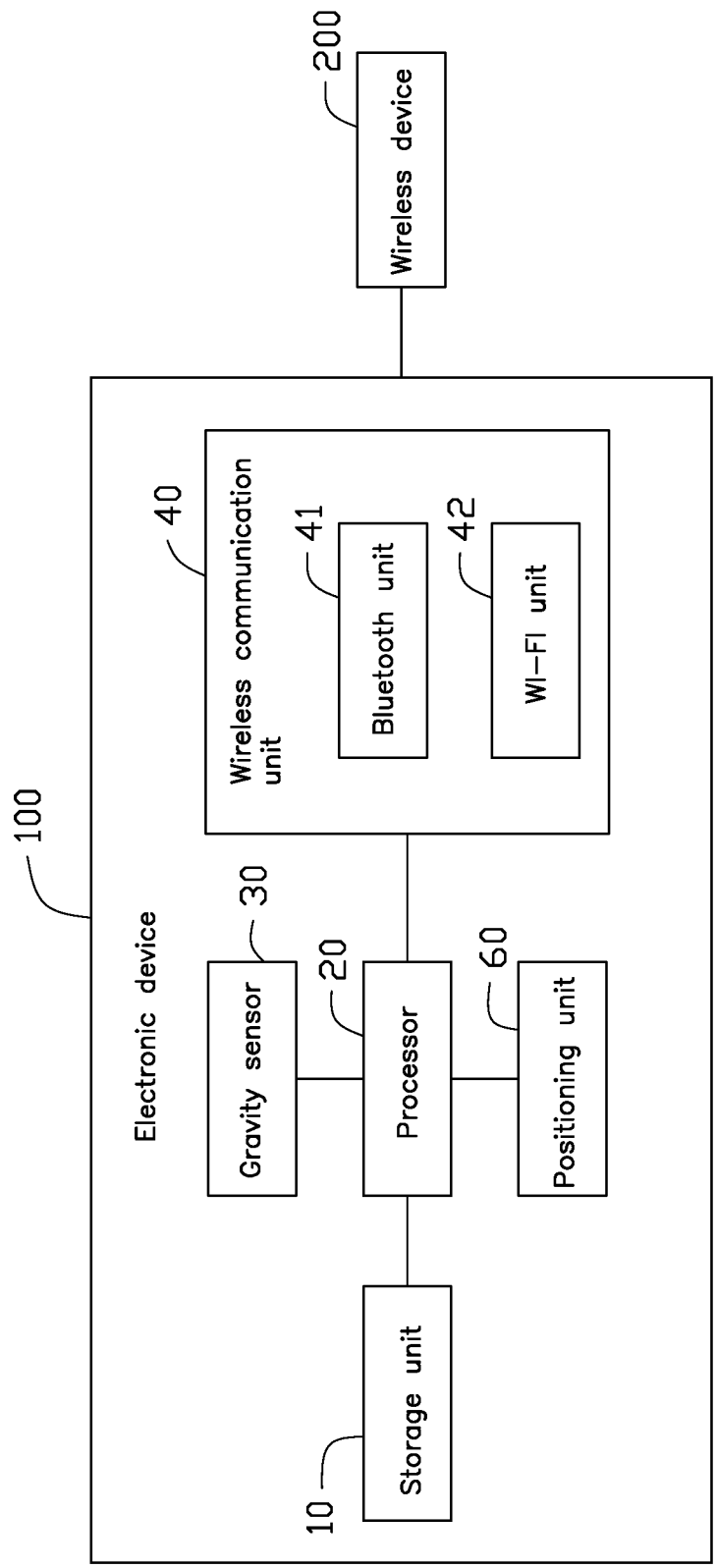
FIG. 1 illustrates a block view of an embodiment of an electronic device and a wireless device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or another storage device.

The term "comprising" means "including, but not necessarily limited to"; it specifically indicates open-ended inclusion or membership in a so-described combination, group, series, and the like.

Embodiments of the present disclosure will be described with reference to the accompanying drawings.

FIG. 1 illustrates an electronic device and a wireless device in one embodiment. The electronic device 100 is configured to connect with the wireless device 200. In the embodiment, the electronic device 100 can be a mobile phone, a tablet computer, a laptop, or the like.

The electronic device 100 includes a storage unit 10, at least one processor 20, a gravity sensor 30, at least one wireless communication unit 40, and a positioning unit 60. The storage unit 10, the gravity sensor 30, the at least one wireless communication unit 40, and the positioning unit 60 are electrically coupled to the at least one processor 20.

The storage unit 10 is configured to store a connection procedure of each module/unit and data generated and processed by each module/unit for connection. The procedure of each module/unit can be run or executed by the at least one processor 20, to accomplish the corresponding specific function.

The at least one processor 20 can be one or more central processing units, one or more microprocessors, or other chip with data processing function. The at least one processor 20 is configured to process the data of each module/unit stored in the storage unit 10.

The gravity sensor 30 is configured to detect an acceleration variation with respect to the three axes (x, y, and z axes) of the electronic device 100 or an acceleration variation with respect to the two axes (x and y axes).

The at least one wireless communication unit 40 includes a bluetooth unit 41 and/or a WI-FI unit 42. The bluetooth unit 41 is configured to access the bluetooth network to match with another electronic device. The WI-FI unit 42 is configured to access the WI-FI network to achieve a data exchange by the WI-FI network.

The positioning unit 60 is configured to provide position information of the electronic device 100. In the embodiment, the positioning unit 60 can be, but is not limited to, a Global Position System unit, a BeiDou Navigation Satellite System, or other location systems. The position information can be a set of coordinates (x, y) and a set of coordinates (x, y, z).

It can be understood that, the electronic device 100 can further include other electronic components, for example, a display device or an input unit. The display device is configured to display a user interface, an application interface, or the like. The input unit is configured to receive user commands or the like.

The wireless device 200 is mounted in a vehicle or a building.

Figure 2:
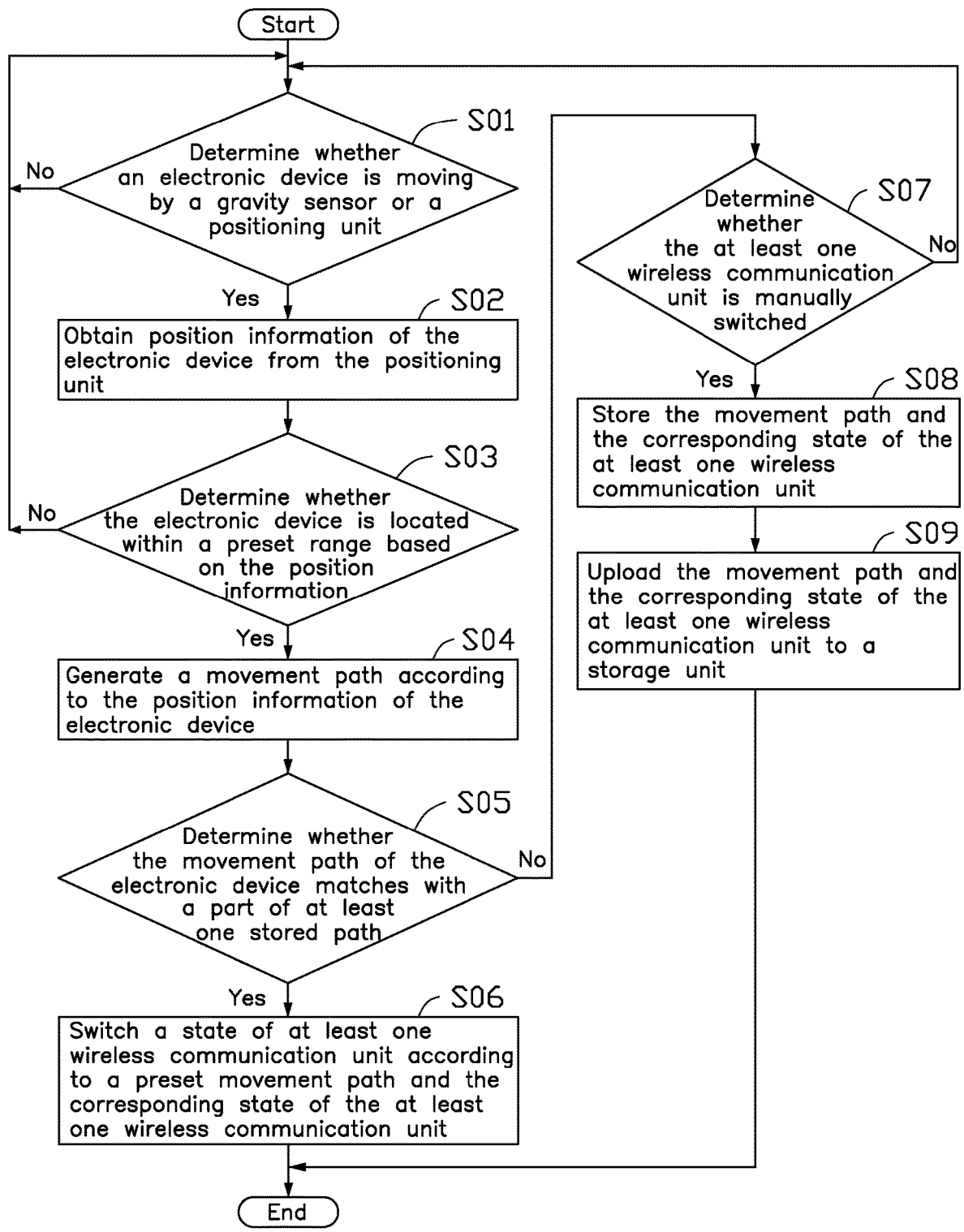
FIG. 2 illustrates a flowchart of an embodiment of a method for connecting to a network.

Referring to FIG. 2, FIG. 2 illustrates a flowchart of a network connection method applied between the electronic device 100 and the wireless device 200. According to different requirements, the order of the blocks in the flowchart can be changed. Fewer blocks can be utilized or a number of blocks can be combined into one block. With reference to the flowchart in FIG. 2, a detailed function of the electronic components of the electronic device 100 will be described. The network connection method can begin at S01:

At block S01, determining whether the electronic device 100 is moving by the gravity sensor 30 or the positioning unit 60.

In the embodiment, when the gravity sensor 30 senses an acceleration variation with respect to the three axes (x, y, and z axes) of the electronic device 100 or an acceleration variation with respect to the two axes (x and y axes), the gravity sensor 30 may convert results of sensing a linear acceleration of the electronic device 100 into electrical signals and output the electrical signals. The electrical signals output by the gravity sensor 30 are transmitted to the processor 20, then the processor 20 determines that the electronic device 100 is moving. In another embodiment, when the positioning unit 60 senses a variation of the set of coordinates (x, y) or a variation of the set of coordinates (x, y, z), the positioning unit 60 may convert results of the position information of the electronic device 100 into electrical signals and output the electrical signals. The electrical signals output by the positioning unit 60 are transmitted to the processor 20, then the processor 20 determines that the electronic device 100 is moving. It can be understood that, when the electronic device 100 is moving, the user together with the electronic device 100 is moving, for example walking. When the electronic device 100 is moving, the procedure goes to block S02. When the electronic device 100 is not moving, the procedure repeats S01.

At block S02, obtaining position information of the electronic device 100 from the positioning unit 60.

At block S03, determining whether the electronic device 100 is located within a preset range based on the position information. The step of determining whether the electronic device 100 is located within a preset range based on the position information includes: obtaining position information of the wireless device 200; and determining whether a distance between the electronic device 100 and the wireless device 200 is within the preset value.

When the electronic device 100 is located within a preset range based on the position information, the procedure goes to block S04. When the electronic device 100 is not located within a preset range based on the position information, the procedure goes to the block S01.

At block S04, generating a movement path according to the position information of the electronic device 100.

In the embodiment, the position information of the electronic device 100 can be obtained continuously. When the position information of the electronic device 100 from the positioning unit 60 is obtained continuously, the processor 20 records corresponding time of the position information and generate a movement path according to the position information of the electronic device 100.

At block S05, determining whether the movement path of the electronic device 100 matches with a part of at least one stored path.

The at least one stored path can be, for example, a path from a parking space to a house (a first recording path), the wireless device 200 is mounted in the house, or a path from an office to a parking space (a second recording path), the wireless device 200 is mounted in a vehicle. When a degree of similarity of the movement path of the electronic device 100 and a part of at least one stored path reaches a preset level, for example, 95%, the processor 20 determines that the movement path of the electronic device 100 matches with a part of at least one stored path. When the movement path of the electronic device 100 matches with a part of at least one stored path, the procedure goes to block S06. When the movement path of the electronic device 100 does not match with a part of at least one stored path, the procedure goes to block S07.

At block S06, switching a state of at least one wireless communication unit 40 according to at least one stored path and the corresponding state of the at least one wireless communication unit 40.

The at least one stored path can be a path prestored in the storage unit 10 and the corresponding state can be the power on or off of the at least one wireless communication unit 40, for example, when the at least one stored path is the first recording path, the WI-FI unit 42 is turned on to couple to the WI-FI network, the bluetooth unit 41 is turned off to save power, or when the at least one stored path is the second recording path, the bluetooth unit 41 is turned on to couple to the bluetooth network but the WI-FI unit 42 is turned off to save power, At block S07, determining whether the at least one wireless communication unit 40 is manually switched.

In the embodiment, the state of the at least one wireless communication unit 40 can be manually switched. For example, the WI-FI unit 42 can be manually switched. When the at least one wireless communication unit 40 is manually switched, the procedure goes to block S08. When the at least one wireless communication unit 40 is not manually switched, the procedure goes to block S01.

At block S08, storing the movement path and the corresponding state of the at least one wireless communication unit 40.

At block S09, uploading the movement path and the corresponding state of the at least one wireless communication unit 40 to the storage unit 10.

In the embodiment, via uploading the movement path and the corresponding state of the at least one wireless communication unit 40 to the storage unit 10, the method establishes a new movement path and the corresponding state of the at least one wireless communication unit 40 for subsequent matching.

The network connection method obtains position information of the electronic device 100 in response to determining that the electronic device 100 is moving, generates a movement path according to the position information of the electronic device 100 in response to determining that the electronic device 100 is located within the preset range, and switches a state of at least one wireless communication unit 40 according to the at least one stored path and the corresponding state of the at least one wireless communication unit 40 in response to determining that the movement path of the electronic device 100 matches with a part of the at least one stored path. Thus, the electronic device 100 switches the state of the at least one wireless communication unit 40 automatically. Thus, a manual operation of the user is not needed, the method can provide a convenient operation.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device for connecting with a wireless device, the electronic device comprising:
   a gravity sensor;
   at least one wireless communication unit;
   a positioning unit;
   a storage system;
   at least one processor; and
   the storage system storing one or more programs, which when executed by the at least one processor, causing the at least one processor to:
      determine whether the electronic device is moving by the gravity sensor or the positioning unit;
      obtain position information of the electronic device from the positioning unit in response to determining that the electronic device is moving by the gravity sensor or the positioning unit;

determine whether a distance between the electronic device and the wireless device is within a preset value based on the position information;

generate a movement path according to the position information of the electronic device in response to determining that the distance between the electronic device and the wireless device is within the preset value;

determine whether the movement path of the electronic device matches with a part of at least one stored path; and switch a state of the at least one wireless communication unit according to the at least one stored path and a corresponding state of the at least one wireless communication unit in response to determining that the movement path of the electronic device matches with a part of the at least one stored path.

2. The electronic device as described in claim 1, further causing the at least one processor to:

determine whether the at least one wireless communication unit is manually switched if the movement path of the electronic device does not match with a part of the at least one stored path; and store the movement path and the corresponding state of the at least one wireless communication unit in response to determining that the at least one wireless communication unit is manually switched.

3. The electronic device as described in claim 2, further causing the at least one processor to:

upload the movement path and the corresponding state of the at least one wireless communication unit to the storage system.

4. The electronic device as described in claim 1, wherein the at least one wireless communication unit comprises a bluetooth unit and/or a WI-FI unit.

5. The electronic device as described in claim 1, wherein the wireless device is mounted in a vehicle or a building.

6. The electronic device as described in claim 1, further causing the at least one processor to:

control the electronic device in a standby mode in response to the gravity sensor or the positioning unit determining that the electronic device is not moving.

7. A network connection method applied between an electronic device and a wireless device, wherein the electronic device comprising a gravity sensor, at least one wireless communication unit, a positioning unit, a storage system, and a processor, the method comprising:

determining whether the electronic device is moving by the gravity sensor or the positioning unit;

obtaining position information of the electronic device from the positioning unit in response to determining that the electronic device is moving by the gravity sensor or the positioning unit;

determining whether a distance between the electronic device and the wireless device is within a preset value based on the position information;

generating a movement path according to the position information of the electronic device in response to determining that the distance between the electronic device and the wireless device is within the preset value;

determining whether the movement path of the electronic device matches with a part of at least one stored path; and switching a state of the at least one wireless communication unit according to the at least one stored path and a corresponding state of the at least one wireless communication unit in response to determining that the movement path of the electronic device matches with a part of the at least one stored path.

8. The network connection method as described in claim 7, further comprising:

determining whether the at least one wireless communication unit is manually switched if the movement path of the electronic device does not match with a part of the at least one stored path; and storing the movement path and the corresponding state of the at least one wireless communication unit in response to determining that the at least one wireless communication unit is manually switched.

9. The network connection method as described in claim 8, further comprising:

uploading the movement path and the corresponding state of the at least one wireless communication unit to the storage system.

10. The network connection method as described in claim 7, wherein the at least one wireless communication unit comprises:

a bluetooth unit and/or a WI-FI unit.

11. The network connection method as described in claim 7, wherein the wireless device is mounted in a vehicle or a building.

12. The network connection method as described in claim 7, further comprising:

controlling the electronic device in a standby mode in response to the gravity sensor or the positioning unit determining that the electronic device is not moving.

13. A non-transitory storage medium storing a set of instructions, when the instructions are executed by at least one processor of an electronic device, the at least one processor being configured to perform a network connection between the electronic device and a wireless device, wherein the instructions comprise:

determining whether the electronic device is moving by the gravity sensor or the positioning unit;

obtaining position information of the electronic device from the positioning unit in response to determining that the electronic device is moving by the gravity sensor or the positioning unit;

determining whether a distance between the electronic device and the wireless device is within a preset value based on the position information;

generating a movement path according to the position information of the electronic device in response to determining that the distance between the electronic device and the wireless device is within the preset value;

determining whether the movement path of the electronic device matches with a part of at least one stored path; and switching a state of the at least one wireless communication unit according to the at least one stored path and a corresponding state of the at least one wireless communication unit in response to determining that the movement path of the electronic device matches with a part of the at least one stored path.

14. The non-transitory storage medium as described in claim 13, further comprising:

determining whether the at least one wireless communication unit is manually switched if the movement path of the electronic device does not match with a part of the at least one stored path; and storing the movement path and the corresponding state of the at least one wireless communication unit in response to determining that the at least one wireless communication unit is manually switched.

15. The non-transitory storage medium as described in claim 14, further comprising:

uploading the movement path and the corresponding state of the at least one wireless communication unit to the storage system.

16. The non-transitory storage medium as described in claim 13, wherein the at least one wireless communication unit comprises a bluetooth unit and/or a WI-FI unit.

17. The non-transitory storage medium as described in claim 13, wherein the wireless device is mounted in a vehicle or a building.

18. The non-transitory storage medium as described in claim 13, further comprising:

controlling the electronic device in a standby mode in response to the gravity sensor or the positioning unit determining that the electronic device is not moving.

* * * * *